July 20, 1937.  C. S. McCANN  2,087,350

SHOCK ABSORBER

Filed Feb. 3, 1936  4 Sheets—Sheet 1

INVENTOR
CHARLES S. McCANN
BY
*Spencer, Hardman and Fehr*
ATTORNEYS

July 20, 1937.  C. S. McCANN  2,087,350
SHOCK ABSORBER
Filed Feb. 3, 1936  4 Sheets—Sheet 2

INVENTOR
CHARLES S. McCANN
BY
Spencer, Hardman and Fehr
ATTORNEYS

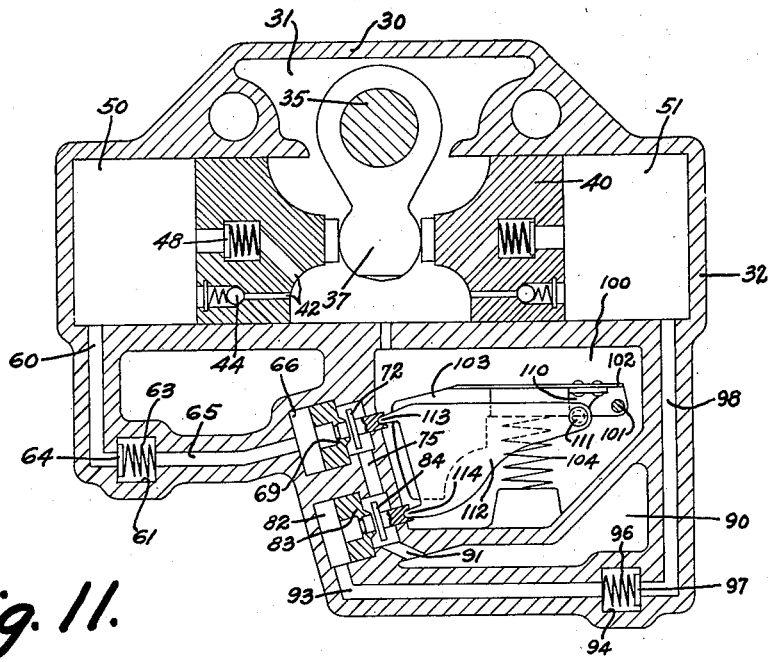

July 20, 1937.  C. S. McCANN  2,087,350
SHOCK ABSORBER
Filed Feb. 3, 1936  4 Sheets-Sheet 4

INVENTOR
CHARLES S. McCANN
BY
Spencer, Hardman & Fehr
ATTORNEYS

Patented July 20, 1937

2,087,350

UNITED STATES PATENT OFFICE 2,087,350

SHOCK ABSORBER

Charles S. McCann, Dayton, Ohio, assignor to General Motors Corporation, Detroit, Mich., a corporation of Delaware Application February 3, 1936, Serial No. 62,152

20 Claims. (Cl. 188—88)

This invention relates to improvements in hydraulic shock absorbers for vehicles and particularly to shock absorbers adapted automatically to adjust themselves in accordance with the nature of the roadbed over which the vehicle is operated.

It is among the objects of the present invention to provide a hydraulic shock absorber with a single inertia mass for adjusting two separate fluid flow control devices of the shock absorber as the mass is moved in opposite directions relative to the shock absorber.

A further object of the invention is to provide the single inertia mass with a mechanism adapted to multiply the force exerted by the mass as it moves in one direction or the other, thereby permitting the use of a comparatively small mass to overcome the effects of comparatively high fluid pressures upon the separate fluid flow control devices actuated by said mass.

These objects and others are attained by providing a shock absorber having two fluid displacement chambers, each of said chambers being provided with a separate outlet duct, each fluid displacement chamber duct including means for controlling the flow of fluid therethrough. The shock absorber is provided also with a single inertia mass movably secured thereto, this mass having a lever pivotally supported thereon, which lever is adapted to engage and actuate one or the other of two separate fluid flow controlling means as said mass is moved in one or the other direction in response to accelerative movements of the shock absorber.

Further objects and advantages of the present invention will be apparent from the following description, reference being had to the accompanying drawings wherein a preferred embodiment of the present invention is clearly shown.

In the drawings:

Fig. 6 is a fragmentary sectional view taken along the line 6—6 of Fig. 2.

Fig. 7 is a fragmentary sectional view taken along the line 7—7 of Fig. 2. Certain portions of this view were taken in a plane beyond the line 7—7 to illustrate other details of construction.

Fig. 11 is a diagrammatic view of the shock absorber showing the various fluid circuits and their fluid flow control devices.

Figure 1:
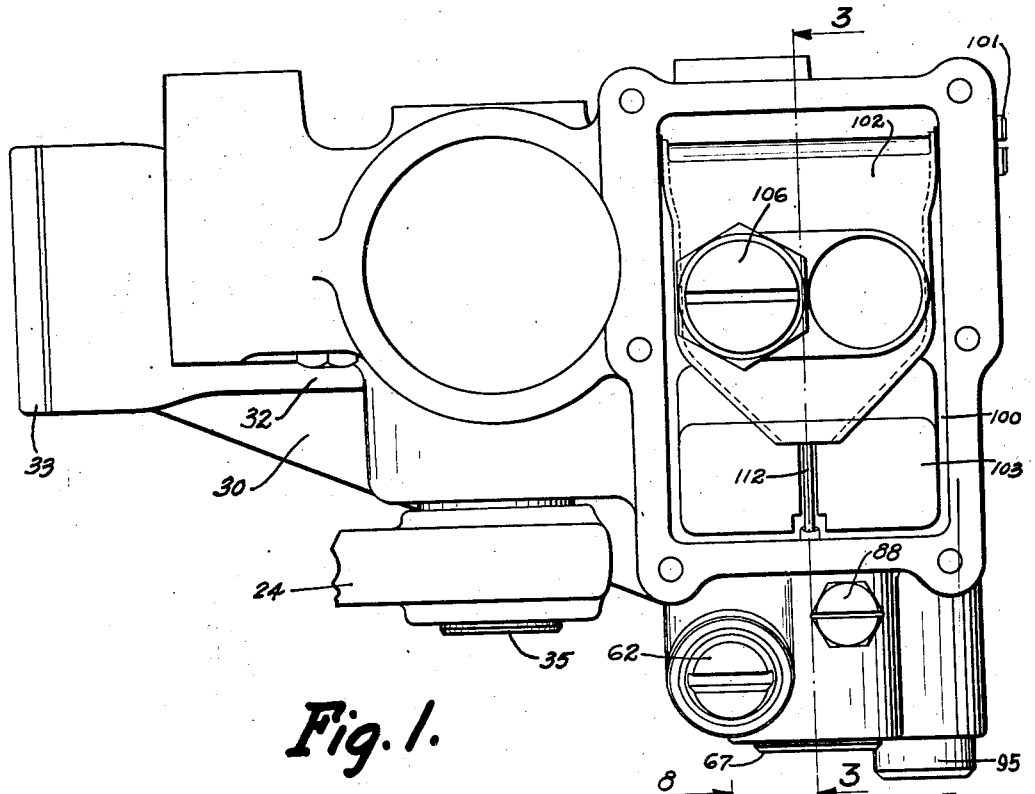
Fig. 1 is a plan view of the shock absorber with the cover plate removed more clearly to illustrate the inertia mass therein.
Figure 2:
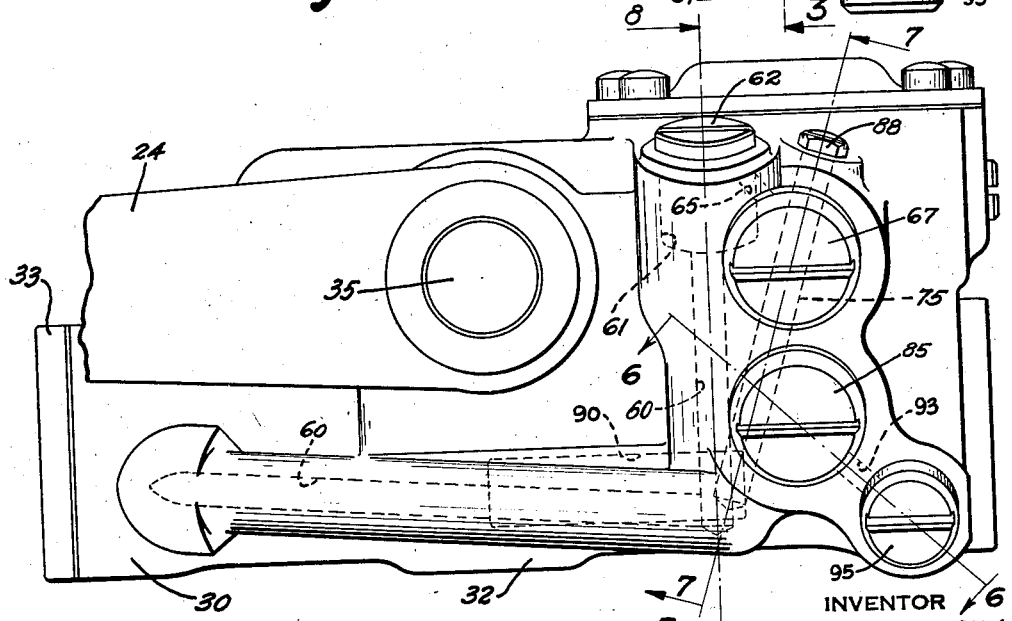
Fig. 2 is a front view of the shock absorber.
Figure 5:
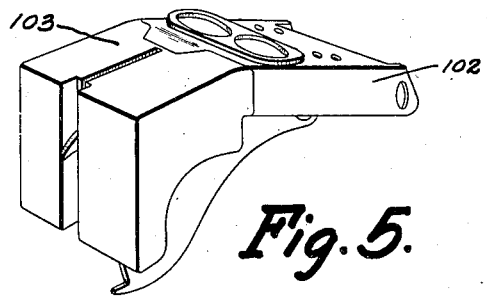
Fig. 5 is a detailed perspective view of the inertia mass and its associate parts.

Referring to the drawings, the numeral 20 designates the frame of the vehicle, which is supported upon the vehicle axle 21 by a spring or springs 22.

The shock absorber of the present invention is adapted to control relative movements between the frame 20 and axle 21 of the vehicle and therefore the shock absorber itself, which is designated as a whole by the numeral 23, is attached to the vehicle frame, while one end of its operating arm designated by the numeral 24 is attached to the axle 21 by means of the link 25. It may readily be seen that upward and downward movements of the axle, that is movement of the axle toward and away from the frame 20 will result in clockwise and counter-clockwise movement of the shock absorber operating arm 24 respectively. These movements of the shock absorber operating arm 24 will in turn cause reciprocation of the piston in the shock absorber cylinder referred to hereinafter.

The shock absorber comprises a casing 30 providing a fluid reservoir 31 and a cylinder 32. The ends of the cylinder are closed by cylinder head plugs 33 and 34 respectively. A shaft 35 is journalled transversely of the shock absorber, one end of the shaft extending to the exterior of the shock absorber and having the operating arm 24 secured thereto. Within the shock absorber casing and particularly within the reservoir portion thereof, this shaft 35 has the operating cam 37 attached thereto so that it will operate with the shaft as the shaft is rotated. The free end of this operating cam or arm extends into the cylinder portion of the shock absorber.

Within the cylinder portion of the shock absorber there is provided a piston 40, of any suitable type. In the present drawings the piston is shown comprising two oppositely disposed head portions adapted to be secured together with an intermediate chamber, the operating cam or arm 37 extending into this chamber and engaging both head portions. Each piston head portion is provided with a fluid passage having a fluid flow control device, and inasmuch as both are identical, only one will be described for the sake of brevity.

Figure 4:
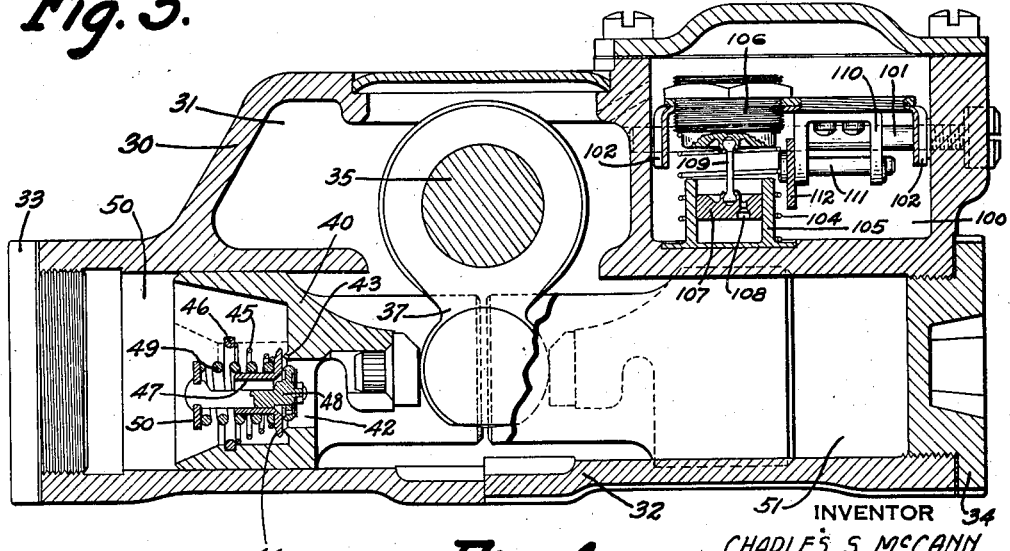
Fig. 4 is a longitudinal sectional view taken through the axis of the shock absorber cylinder.
Figure 10:
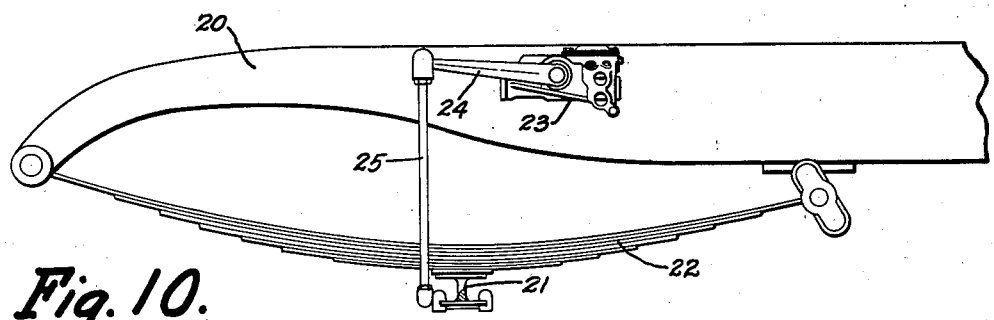
Fig. 10 is a view showing one end of a vehicle frame with a shock absorber equipped with the present invention attached thereto.

Referring to Fig. 4, the passage in the piston head portion is designated by the numeral 42. This passage has an annular ridge 43 providing a seat for the intake valve 44 which is urged against this seat by a spring 45. Spring 45 has one end abutting the valve 44, the other end resting against a ring 46 seated in an annular groove provided in the interior surface of the piston head. The intake valve has a central tubular portion 47 upon which a pressure release valve 48 is slidably supported. The valve 48 is normally urged to close the central passage in intake valve 44 by a spring 49, one end of which abuts a collar 50 secured to the stem of valve 48. This valve structure is of the standard type as used in hydraulic shock absorbers, fully illustrated and described in the patent to Kindl, 1,948,036, dated February 20, 1934.

For purpose of this description it is sufficient to say that as the piston 40 moves toward the right as regards Fig. 4, valve 44 will be moved from its seat to permit a substantially free flow of fluid from the reservoir 31 through the piston passage 42 into the fluid displacement chamber 50, formed in one end of the cylinder 32 by the piston 40. The displacement chamber at the opposite end of the cylinder is designated by the numeral 51. As the piston moves in the opposite direction, that is toward the left as regards Fig. 4, valve 48 will be actuated at a predetermined fluid pressure to permit fluid to flow through the valve 44 from chamber 50 into the reservoir 31. The valve 48, however, will not be actuated to establish this fluid flow until a predetermined high fluid pressure is attained within chamber 50.

The piston head portion forming displacement chamber 51 is, as has been mentioned before, provided with a similar valve mechanism which acts in an identical manner that is, as the piston moves toward the left, a substantially free flow of fluid will be permitted into the chamber 51 and, as the piston moves to the right as regards Fig. 4, a restricted flow of fluid will be provided from chamber 51 into the reservoir 31 after the fluid pressure within chamber 51 has attained a relatively high value.

As has been mentioned in the statement of the objects of the invention, the present shock absorber is adapted automatically to adjust itself in accordance with the nature of the roadbed over which the vehicle is operated. This automatic adjustment is obtained through the use of an inertia mass, which, acting in response to accelerations in the upward or downward movements of the shock absorber, actuates the fluid flow control device to control fluid flows proportionately with and in response to such accelerative movements. To attain this type of control in hydraulic shock absorber the displacement chamber 50 has a duct or passage 60 leading therefrom which duct or passage discharges into a valve chamber 61. In Figs. 1, 2, 3, 7 and 8 this valve chamber 61 is shown closed by a screw plug 62, said screw plug forming an abutment for one end of the spring 63 which yieldably urges valve 64 normally to shut off communication between the duct or passage 60 and the valve chamber 61. This valve structure 64 would ordinarily be included in the sectional view in Fig. 8, however, in order to show another passage 65 terminating in this valve chamber, it was deemed best not to show the valve in this Fig. 8. The valve for this chamber 61 is identical in structure to the valve mechanism shown in the Fig. 6, and it is thought therefore that the showing of the valve in Fig. 8 may properly be eliminated.

Valve chamber 61 as shown in the diagrammatic view Fig. 11, and in the other detail views, has a passage 65 leading therefrom, which passage 65 terminates in another valve chamber 66 formed in the casing of the shock absorber. The outer end of valve chamber 66 is closed by the screw plug 67 shown in the views 1, 2, 3, 7 and 8.

Figure 3:
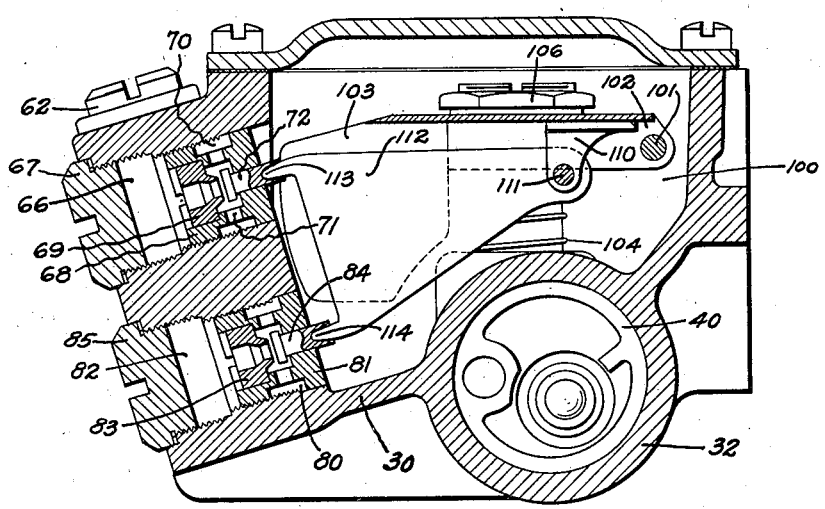
Fig. 3 is a sectional view taken along the line 3—3 of Fig. 1.

Referring to Fig. 3, the chamber 66 is shown threadedly supporting a sleeve member 68, one end of said sleeve member being recessed to receive the valve-seat 69. An annular groove 70 is provided in the outer surface of said sleeve 68 which groove is in communication with the interior recess portion of said sleeve through cross passage 71. A valve 72, shown in the drawings as of the "poppet" type, is slidably carried by the sleeve member 68 so as to be adapted to be moved into engagement with the valve-seat member 69 as will be described. This valve 72 is provided to control fluid flow through valve-seat member 69 from chamber 66 adjacent the screw plug 67 to the chamber portion including passages 71 and the annular groove 70.

Figure 9:
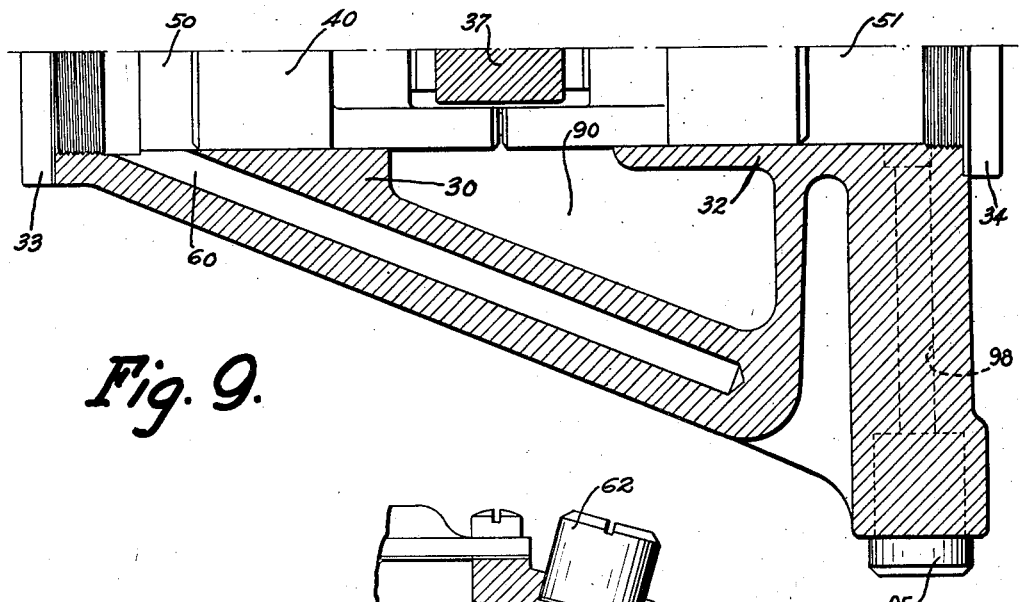
Fig. 9 is a fragmentary sectional view showing the duct leading from one of the fluid displacement chambers as well as one portion of the fluid reservoir of the shock absorber.
Figure 8:
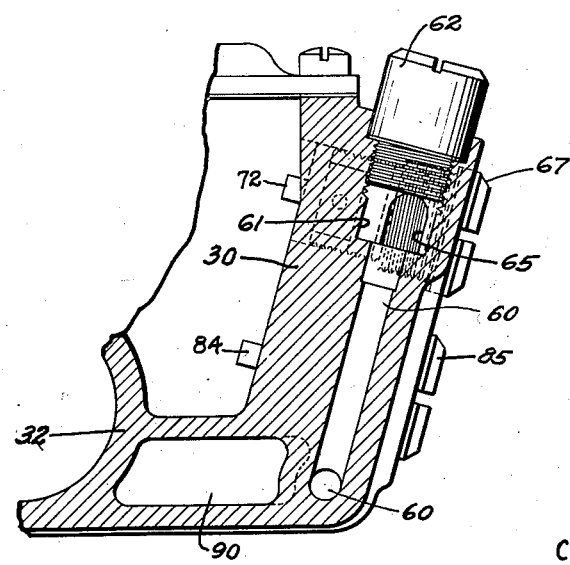
Fig. 8 is a fragmentary sectional view taken along the line 8—8 of Fig. 2.

The casing of the shock absorber has a passage 75 communicating with the annular groove 70 provided in the member 68. This passage also communicates with a similar annular groove 80 provided in a sleeve 81 located within the valve chamber 82. This sleeve 81 in valve chamber 82 is exactly like the element 68 shown in valve chamber 66 and has a valve seat member 83 and a valve 84 corresponding to valve seat member 69 and valve 72 in the valve chamber 66. Valve chamber 82 has its one end closed by the screw plug 85, which is clearly shown in the Figs. 2, 3, 6, 7, and 8. The outer end of passage 75 is closed by the screw plug 88. Valve chamber 82 communicates with the chamber 90 which is in communication with the reservoir 31 as shown in Fig. 9 and may therefore be termed the reservoir. The duct providing communication between the reservoir and valve chamber 82 is designated by the numeral 91, which passage is clearly shown in Fig. 7. The passage or duct portions referred to by the numerals 75 and 91 are really one continuous passage, being drilled from the exterior of the shock absorber to the reservoir portion 90, the outer end of this passage being closed, as has been mentioned heretofore by the screw plug 88.

As shown in Fig. 11, passage 75 leads to that portion of the valve chamber 82 occupied by the valve 84. The portion of the valve chamber 82 on the side of the valve-seat opposite valve 84 has a passage 93 leading therefrom, which passage 93 communicates with the valve chamber 94. This is clearly shown structurally in the Fig. 6. The valve chamber 94 has its outer end closed by the screw plug 95, which acts as an abutment for the spring 96, said spring normally urging valve 97 to shut off communication between the valve chamber 94 and the duct or passage 98 leading from the displacement chamber 51 to the valve chamber 94. As has been mentioned heretofore, valve 97 with its spring 66 is identical to the valve provided in the valve chamber 61 shown in Fig. 8.

The shock absorber casing 30 provides a chamber 100 for housing the inertia mass of the device. This inertia mass comprises a weight portion 103 and bracket portions 102 and 110, the bracket portion 102 being hingedly supported by the cross pin 101 secured to the casing 30 and extending across the chamber 100. The weight has a central slot which receives the actuator lever 112 pivotally supported by pin 111 which in turn is carried by the bracket portion 110. The end of the actuator lever, opposite the pivot pin 111 is widened, providing spaced tongues 113 and 114. Tongue 113 extends into the concaved end of the stem of valve 72, while tongue 114 extends into the similarly concaved end of the stem of valve 84. The inertia mass is yieldably held suspended by a spring 104, one end of which fits about and rests upon a cylinder 105 seated in the casing, the other end of the spring engaging an adjustable screw 106 threaded to the bracket portion 102 of the weight. The cylinder 105 contains a piston 107 provided with a small orifice 108, the piston in turn being connected with the inertia mass bracket by a rod 109 which is pivotally secured to both the piston 107 and the adjustable screw 106. This piston and cylinder 105 provide a dashpot tending to control or slow down the excessive movements of the inertia mass.

When the weight is suspended in its normal position, that is, in the position in which the weight is not affected by accelerations in the movement of the shock absorber, a plane passing through the center of the pivot screw 101 and the pivot pin 111 will pass through a point equidistant between the two tongues 113 and 114 of the actuator 112.

The normal position of the axes of pivot pins 101 and 111 relative to the tongues 113 and 114 provide a toggle which, in response to movements of the mass 103 in one direction, will exert a push upon the valve 72 and, as the inertia mass moves in the opposite direction will exert a push upon the other valve 84. More specifically, if the inertia mass 103 moves upwardly in response to downward accelerations of the shock absorber, then the pivot pin 111 is moved toward the plane intersecting the pivot pin 101 and the point of tongue 113 thus the actuator 112 will exert a pushing effect upon valve 72. On the other hand, as the inertia mass 103 is moved downwardly relative to the shock absorber in response to upward accelerations thereof, then the axis of the pivot pin 111 of the actuator 112 will be moved into a plane intersecting the pivot pin 101 and the end of tongue 114, consequently exerting a pushing effect upon valve 84.

The shock absorber just described operates in the following manner:

Supposing a road wheel of the vehicle strikes an obstruction in the roadbed and is thrown upwardly toward the frame 20 of the vehicle. The shock absorber arm 24, due to its connection with the axle 21 of the vehicle, will consequently be moved in a clockwise direction, causing a clockwise movement of the actuating cam or arm 37, resulting in a shifting of the piston 40 toward the left as regards Fig. 11. Pressure upon the fluid in chamber 50 will urge said fluid through duct 60 against the valve 64. When this pressure has attained a predetermined value, valve 64 will be moved from its seat permitting fluid to flow into the valve chamber 61 from which chamber the fluid will flow through duct 65 into the valve chamber 66 and through the valve-seat member 69 past the valve 72, which is normally not engaged by tongue 113 of lever 112 and thus will not restrict this flow of fluid through member 69. From here the fluid will flow through duct 75, that part of valve chamber 82, containing valve 84, duct 91, into the reservoir 90. The valve 64 will restrict the fluid flow from chamber 50, thus causing the shock absorber to resist to a predetermined degree this upward movement of the axle toward the frame. If the fluid pressure within frame 50 is excessive, due to the striking of a large obstruction by the road wheel, and this excessive pressure cannot properly be relieved by the valve 64, then valve 48 in the piston 40 will be moved from its seat to establish an additional flow of fluid from the chamber 50 through the piston 40 into the reservoir 31.

As the axle is moved away from the body in response to rebounding movements of the vehicle spring 22, a reverse movement of the piston 40 obtains. The piston now moving toward the right as regards Fig. 11 will urge fluid from chamber 51 through the duct 98, the fluid pressure, when attaining a predetermined degree, urging valve 97 from its seat, permitting fluid to flow into chamber 94, thence through duct 93 into valve chamber 82 through the valve-seat member 83 therein, past the open valve 84, thence through duct 91 into the reservoir 90. If valve 97 does not sufficiently relieve the fluid pressure built up in chamber 51, then the valve in the right end of the piston, corresponding to valve 48 in the opposite end of the piston, will be actuated to permit a flow of fluid through this end of the piston from the chamber 51 into the reservoir 31.

Now supposing that, in response to upward thrusts of the axle 21, the frame 20 of the vehicle is moved upwardly at an accelerative rate so that the inertia mass 103 is moved downwardly relative to the shock absorber casing. As the frame 20 of the vehicle moves upwardly at this accelerated rate, a movement of the shock absorber piston toward the right will result, causing fluid to be urged from chamber 51 through the duct 98. The valve 97 does not provide proper restriction to fluid flow under these circumstances, consequently another restriction, causing the shock absorber to control this accelerative rate of the movement of the body upwardly is provided. This fluid flow restricting means is the valve 84 which, by the movement of the mass 103 downwardly is pushed by the actuator 112 toward the valve seat 83, thereby restricting the fluid flow from passage 93 through the valve seat 83. As long as the vehicle body moves upwardly at a rate sufficiently accelerated to maintain the inertia mass 103 in its down position, valve 84 will be urged to restrict the fluid flow from displacement chamber 51 and consequently the shock absorber is automatically adjusted to provide resistance to this movement of the vehicle body.

On the other hand, supposing that the vehicle frame 20, upon which the vehicle body is carried, moves downwardly at an accelerated rate, causing a movement of the piston 40 toward the left. As the body moves downwardly at this accelerated rate, the weight 103 will be urged upwardly thus moving the actuator 112 to exert a push upon valve 72, thereby increasing the restriction to the fluid flow from passage 65 through the valve seat 69 and consequently restricting the fluid flow from chamber 50 in accordance with and proportionately to this accelerative movement of the vehicle frame 20 downwardly. This restriction to the fluid flow from chamber 50 will cause the shock absorber to provide the proper resistance to this movement of the vehicle frame 20.

The peculiar construction of the inertia mass 103 and the actuator 112 pivoted thereto in combination with the valves 72 and 84 provides a regulating means for restricting fluid flow in accordance with accelerative movements of the shock absorber in an upward and downward direction. The actuator combined with the inertia mass as shown cooperates therewith to provide a force multiplying means whereby a comparatively small inertia mass may overcome comparatively high pressures acting against the valves 72 and 84.

Applicant has provided a hydraulic shock absorber having two fluid displacement members 50 and 51, each provided with a separate duct, the displacement chamber 50 having the duct 60 and its associate ducts and valve chambers leading to the reservoir 90, and the valve chamber 51 having the separate duct 98 and its associate passage and valve chamber also leading to the reservoir 90. Fluid flow control devices or valves are provided in each duct, valves 64 and 72 in the one and valves 97 and 84 in the other. Valve 64 in the duct of displacement chamber 50 is spring-loaded normally to close this duct, while valve 72 also in the duct of chamber 50 is separate from said spring-loaded valve 64, but is adapted to be actuated mechanically to restrict fluid flow permitted by the valve 64. In the same manner spring-loaded valve 97 normally closes the duct from chamber 51 and mechanically actuated valve 84, separate from valve 97, is adapted to be moved to restrict fluid flow permitted by the spring-loaded valve 97. The inertia mass 103 is movably carried by the shock absorber and has pivoted thereto the actuator 112 which cooperates with the mass in such a manner that movement of the mass in one direction or the other will exert a multiplied force upon valves 72 and 84 to actuate said valves against a comparatively high pressure, tending to maintain said valves open.

It is important to the satisfactory operation of a shock absorber of this type that the inertia weight be provided with a dashpot, which, under certain circumstances impedes the free action of the inertia weight. For instance when a vehicle, equipped with a shock absorber of this type without a dashpot on the inertia weight, is being operated over a washboard type roadbed the resulting axle-dance, will cause car body movements sufficiently accelerated to actuate the inertia weight, these movements being, however, of short travel and duration. This car body movement will result in movement of the inertia weight, thereby actuating the valves associated therewith to restrict fluid flow. Under these circumstances the shock absorber acts as a tie between the axle and body of the vehicle permitting these fast axle movements to be transmitted to the body and thus causing a harsh ride. For such conditions it is preferable to restrict the flow of fluid by the softer spring loaded static valves 64 and 97 instead of by the harsh inertia valves. In order that the inertia mass be controlled so that it will not too freely function in response to such short body movements applicant provides the dashpot which will restrain movements of the inertia mass under these circumstances and thus permits the softer static valves to provide fluid restriction instead of introducing the harsher valves associated with the inertia mass. The dashpot will not effect operation of the inertia weight in response to the more extensive accelerated movements of the vehicle body but it will prevent chattering of the inertia weight in response to body movements caused by axle-dance as the vehicle is being operated over a roadbed having repeated small bumps or obstructions.

The shock absorber as provided in the present invention is adapted automatically to adjust itself in accordance with the nature of the roadbed over which the vehicle is being operated and the construction of the automatic control mechanism as disclosed permits the use of a comparatively small inertia mass to regulate comparatively high pressure.

While the embodiment of the present invention as herein disclosed, constitutes a preferred form, it is to be understood that other forms might be adopted, all coming within the scope of the claims which follow.

What is claimed is as follows:

1. In a hydraulic shock absorber having two fluid displacement chambers each provided with a separate outlet duct; the combination with control means for regulating the flow of fluid from each outlet duct; an inertia mass; and actuator means pivotally carried by the mass and movable thereby into one or another position in which said actuator means actuates one or the other fluid flow control means to increase its restriction to fluid flow.

2. In a hydraulic shock absorber having two fluid displacement chambers each provided with an outlet duct, the combination with means for controlling the flow of fluid from each outlet duct; an inertia mass movably carried by the shock absorber; and an actuator pivotally supported by the inertia mass and adapted to be moved by said mass to actuate the fluid flow controlling means of one or the other duct to increase its restriction to the flow of fluid from its respective duct in response to accelerations in the upward or downward movements of the shock absorber respectively.

3. In a hydraulic shock absorber having two fluid displacement chambers each provided with an outlet duct, the combination with means for controlling the flow of fluid from each outlet duct; an inertia mass movably carried by the shock absorber; an actuator pivoted to the inertia mass and cooperating therewith to form a toggle joint adapted to actuate one or the other of said fluid flow controlling means to increase its restriction to fluid flow in response to actuations in the upward or downward movements of the shock absorber respectively.

4. In a hydraulic shock absorber having two fluid displacement chambers each provided with an outlet duct, a valve in each duct normally providing a minimum restriction to fluid flow therefrom; an inertia mass; and means pivoted upon and cooperating with the inertia mass to provide a mechanical force multiplying device adapted to actuate both valves to increase their restriction to the flow of fluid from their respective ducts, one as the inertia mass moves in one direction in response to accelerations in the upward movement of the shock absorber and the other as the inertia mass moves in the other direction in response to accelerations in the downward movement of the shock absorber.

5. In a hydraulic shock absorber having two fluid displacement chambers each provided with an outlet duct; a valve in each duct; an inertia mass; and a lever pivoted to said mass and cooperating therewith to provide a mechanical force multiplying means adapted to actuate one or the other of said valves to increase its restriction to the flow of fluid from its respective duct as the mass is moved in one direction or the other in response to accelerations in the movement of the shock absorber in opposite directions respectively.

6. In a hydraulic shock absorber having two fluid displacement chambers each provided with an outlet duct, the combination with a valve for each duct; of an inertia mass pivotally carried by the shock absorber; and a lever pivoted to the mass and having portions adapted to engage said valves for multiplying the force of the inertia mass to actuate said valves to restrict the flow of fluid from their respective ducts in response to movement of the weight in one direction or the other respectively.

7. In a hydraulic shock absorber having two fluid displacement chambers each provided with an outlet duct terminating in a valve-chamber, of a valve in each valve-chamber adapted to be actuated to restrict the flow of fluid from its duct; an inertia mass pivotally supported by the shock absorber; a spring holding said inertia mass in normally suspended position; and a lever pivotally secured to the inertia mass so that normally a plane passing midway between the valve chambers will intersect the axes of the pivots of both the lever and inertia mass, said lever having ears at its end more remote from its pivotal point adapted to actuate one or the other valve as the movement of the inertia mass shifts the pivotal point of the lever above or below said plane respectively.

8. In a hydraulic shock absorber having two fluid displacement chambers each provided with an outlet duct, the combination with a pair of fluid flow control valves, one for each duct; of an inertia mass pivotally supported in the shock absorber; a spring yieldably supporting said inertia mass in a predetermined normal position; a pivot pin secured to the inertia mass in such a position that a plane passing through the axis of the inertia mass pivot and midway between the two valves will intersect the axis of said pivot pin when the inertia mass is in normal position; and a lever supported by the pivot pin and having extending ear portions adapted to engage and actuate one or the other of said valves to increase its restriction to fluid flow as the inertia mass moves in one direction or the other respectively from its normal position.

9. A hydraulic shock absorber having two fluid displacement chambers each provided with an outlet port; a fluid displacement member; a valve for restricting the flow of fluid from each port; an inertia weight; and a lever hinged to the weight and operatively connecting the weight with both valves, and adapted to multiply the force of the weight against one or the other valve as the weight moves in one or the other direction from normal position.

10. A hydraulic shock absorber having two fluid displacement chambers each of which is provided with an outlet duct; a fluid displacement member; a valve for each outlet duct; a yieldably suspended inertia weight; and a lever one end of which is pivotally attached to the inertia weight, the other end having spaced portions engaging said valves, said lever and weight cooperating to provide a toggle joint normally permitting both valves to maintain their respective ducts open, but adapted to multiply the force of the weight upon either valve to actuate it to restrict the flow of fluid from its duct in response to movement of the inertia weight out of normal position.

11. In a hydraulic shock absorber having two fluid displacement chambers each of which is provided with an outlet passage, the combination with resilient means normally closing each of said passages; of separate means for each passage adapted to be actuated to restrict the flow of fluid therefrom; an inertia mass; and means pivotally secured to the mass and adapted to cooperate therewith to provide a force multiplying mechanism to actuate one or the other of said separate means in response to movement of the inertia mass in one or the other direction respectively.

12. In a hydraulic shock absorber having two fluid displacement chambers each of which is provided with an outlet duct, the combination with a spring loaded valve normally closing each duct; of a control valve for each duct, adapted to be actuated to restrict the flow of fluid from a spring loaded valve; and a force multiplying mechanism comprising an inertia mass and a lever pivotally supported thereby for actuating separately, each control valve in response to movements of the inertia mass in one direction or the other respectively.

13. In a hydraulic shock absorber having two fluid displacement chambers each of which is provided with an outlet duct, the combination with a spring loaded valve normally closing each duct; of a control valve for each duct, adapted to be actuated to restrict the flow of fluid from a spring loaded valve; and a toggle joint comprising a pivotally supported inertia mass and a lever pivotally secured to said mass, for actuating said control valve separately in response to movements of the inertia mass in one direction or the other respectively.

14. In a hydraulic shock absorber having two fluid displacement chambers each provided with an outlet duct in communication with a fluid reservoir, the combination with a spring loaded valve normally closing each duct; of a control valve in each duct adapted to be actuated mechanically to restrict fluid flow from the duct into the reservoir; an inertia mass movable in one direction in response to accelerations in the movement of the shock absorber in one direction and movable in the opposite direction in response to accelerations in the movement of the shock absorber in the opposite direction; and means pivotally secured to the inertia mass and cooperating therewith to provide a force multiplying mechanism adapted to actuate one or the other control valves in response to the movements of the inertia mass in one or the other direction respectively.

15. A hydraulic shock absorber comprising, in combination, a fluid reservoir; two fluid displacement chambers each provided with an outlet duct communicating with the reservoir; two separate and independent fluid flow control devices in each duct, the first being spring loaded and normally closing its duct, the second being adapted to be actuated mechanically to restrict fluid flow from the duct into the reservoir; and inertia mass controlled means for actuating one or the other of said second fluid flow control devices as the inertia mass moves in one or the other direction respectively.

16. A hydraulic shock absorber comprising, in combination, a fluid reservoir; two fluid displacement chambers each provided with an outlet duct communicating with the reservoir; two separate and independent fluid flow control devices in each duct, the first being spring loaded and normally closing its duct, the second being adapted to be actuated mechanically to restrict fluid flow from the duct into the reservoir; and means for actuating one or the other of said second fluid flow control devices, said means comprising a pivotally supported inertia mass and a single lever pivotally secured to the mass.

17. A hydraulic shock absorber comprising, in combination, a casing providing a fluid reservoir and a cylinder; a piston in said cylinder forming two fluid displacement chambers therein each of which has an outlet duct communicating with the fluid reservoir; resilient means normally closing each duct; means in each duct, separate from said resilient means, adapted to be actuated to restrict the flow of fluid through its duct; and an inertia mass pivotally carrying means for actuating one or the other of the last mentioned means.

18. A hydraulic shock absorber comprising, in combination, a casing providing a fluid reservoir and a cylinder; a piston in said cylinder forming two fluid displacement chambers therein each of which has an outlet duct communicating with the fluid reservoir; a spring loaded valve in each duct, normally closing its duct; a poppet valve in each duct, separate from the spring loaded valve, adapted to be actuated mechanically to restrict the flow of fluid through its duct; and inertia means adapted to actuate one poppet valve when said means moves in one direction and the other poppet valve when it moves in the opposite direction.

19. A shock absorber for absorbing energy, comprising, in combination, fluid containing chambers of variable volume, means through which fluid is admitted into each chamber, a conduit through which fluid flows when leaving each chamber; resilient means for controlling the flow of fluid through each conduit; fluid flow controlling means separate from said resilient means for also controlling the flow of fluid through each conduit; and inertia means adapted separately to actuate each fluid flow controlling means to increase its restriction to fluid flow, one as the inertia means moves in one direction and the other as the inertia means moves in the opposite direction relatively to the shock absorber.

20. A shock absorber for absorbing energy, comprising, in combination, fluid containing chambers of variable volume, means through which fluid is admitted into each chamber, a conduit through which fluid flows when leaving each chamber; resilient means for closing each conduit to resist the flow of fluid therethrough; means adapted to be actuated mechanically to resist the flow of fluid through each conduit; and inertia means comprising an inertia mass and a lever pivotally secured thereto, for actuating one or the other of the mechanically actuated means.

CHARLES S. McCANN.